United States Patent Office
3,361,846
Patented Jan. 2, 1968

3,361,846
PHENOLIC PHOSPHATE AND PHOSPHITE ESTERS AS STABILIZERS FOR SATURATED POLYESTER RESINS
Clyde E. Gleim, Akron, and John E. Hrivnak, Uniontown, Ohio, assignors to The Goodyear Tire & Rubber Company, Akron, Ohio, a corporation of Ohio
No Drawing. Filed July 9, 1964, Ser. No. 381,518
17 Claims. (Cl. 260—860)

ABSTRACT OF THE DISCLOSURE

Highly polymeric condensation polyester resins having superior stability and improved color are produced by incorporating in the resins a hindered phenolic phosphite or phosphate ester as a stabilizer. The stabilizer may be added at various stages of polyester preparation.

This invention relates to an improvement in condensation polyester resins and to a method for preparing condensation polyester having improved stability.

Highly polymeric polyesters are derived from glycols and dicarboxylic acids or ester-forming derivatives thereof by condensation reaction. In carrying out such reactions the reactants are treated under stringent conditions of elevated temperature and reduced pressure for considerable periods of time. The polymeric polyesters prepared develop a light yellow or brown color which is highly undesirable because such color is carried over into products made from the polyester resins. Development of any yellow or brown color is especially undesirable in fibers and films which constitute a major use for condensation polyester resins. In addition to the development of color, condensation polyesters degrade on exposure to heat and to conditions that favor hydrolysis of ester compounds.

It is an object of the present invention to produce polyester resins of improved stability. Another object is to produce polyester resins having improved stability when aged in air at elevated temperatures. Another object is to provide a method of producing polyester resins having a low degree of color and which have good thermal and hydrolytic stability. Other objects will appear as the description of the invention proceeds.

According to the invention highly polymeric condensation polyester resins having superior stability and improved color are produced by incorporating in the resins a hindered phenolic phosphorous composition having the general formula

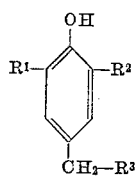

in which $R^1$ and $R^2$ are the same or different radicals selected from the group consisting of tertiary alkyl radicals of 4 to 10 carbon atoms such as tertiary butyl, t-amyl, t-octyl radicals, and aralkyl radicals such as benzyl, alpha methyl benzyl, ortho methyl alpha methyl benzyl, meta methyl alpha methyl benzyl and $R^3$ is a phosphorous containing radical selected from the group consisting of (A)

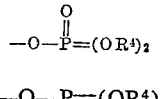

and (B)

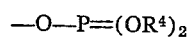

radicals in which the $R^4$ radicals in (A) and (B) are selected from the group consisting of hydrogen, alkyl, aryl, alkaryl, and aralkyl radicals. For example, $R^4$ can be an alkyl radical, such as methyl, ethyl, propyl and butyl; alkaryl radicals, such as tolyl and xylyl; aralkyl radicals, such as benzyl ortho methyl benzyl, para methyl benzyl and aryl radicals, such as phenyl and naphthyl.

Representative examples of compounds of the invention are 4-hydroxy 3,5-di-t-butyl benzyl dimethyl phosphite

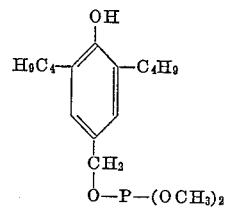

4 hydroxy 3,5 di t-butyl benzyl dimethyl phosphate

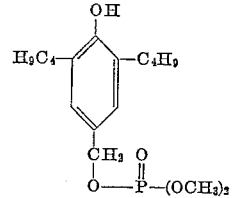

4 hydroxy-3,5-di t-butyl benzyl diphenyl phosphite

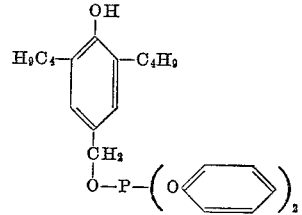

4 hydroxy-3,5 di t-butyl benzyl diphenyl phosphate

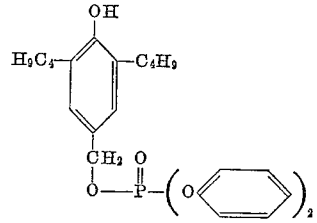

4-hydroxy-3,5-di (methyl benzyl) benzyl dimethyl phosphite

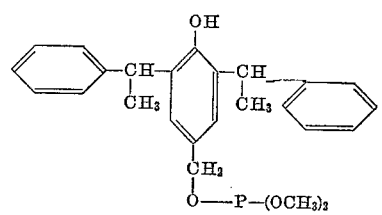

The practice of the invention is illustrated by the following examples.

Example 1

A mixture of 5.07 pounds of dimethyl terephthalate and 3.57 pounds of ethylene glycol were charged into a 12 liter glass-type ester interchange reactor. The mixture was heated to about 145° C. to melt the diester. Then 0.036% zinc acetate dihydrate and 0.025% antimony trioxide, based on the weight of dimethyl terephthalate, was added. The temperature of the reaction mixture was raised from 145° C. to 210° C. over a period of 2.5 hours at atmospheric pressure to complete the ester interchange reaction. The reaction product consisting essentially of bis hydroxyethyl terephthalate and some oligomers (low polymer), was then transferred to a stainless steel polymerization vessel. The polycondensation reaction was carried out by raising the temperature to about 275° C. while reducing the pressure to less than one millimeter of mercury pressure during a period of about one hour and then heating at 275° C. to 280° C. for two hours at this pressure.

The vessel was then brought back to atmospheric pressure and 5.75 grams (0.25%) of 4 hydroxy 3,5 di-t-butyl benzyl dimethyl phosphite stabilizer (based on weight of dimethyl terephthalate used) was added to the polymeric ethylene terephthalate melt and stirred in for three minutes at atmospheric pressure and then for 10 minutes under reduced pressure. The resulting stabilized polymeric ethylene terephthalate had an intrinsic viscosity of 0.718 as determined in a 60/40 phenol/s-tetrachloroethane mixture at 30° C.

A sample of the stabilized polymer was ground to pass a 20 mesh sieve and then dried in an open Petri dish in a vacuum oven for 16 hours at 135° C. at about one millimeter of mercury pressure. The dried polymer was aged for twenty-four hours at 200° C. in an electrically heated oven at atmospheric pressure in presence of air. Samples of the aged polymer were checked for loss in intrinsic viscosity and for carboxyl number increase.

The polymeric ethylene terephthalate polymer, stabilized and aged as described above, had 0.30% broken bonds and a carboxyl number increase from 49 to 168 equivalents per $10^6$ grams.

A dried polymeric ethylene terephthalate control sample aged for twenty-four hours at 200° C. under similar conditions had 0.97% broken bonds and a carboxyl number increase from 54 to 291 equivalents per $10^6$ grams.

*Example 2*

Seven-tenths mole of dimethyl terephthalate and 0.1 mole dimethyl isophthalate were reacted with 2.3 moles of tetramethylene glycol in the presence of 0.00165 mole of lead diacetate trihydrate at about 245° C. A distillate, consisting of methanol and some tetrahydrofuran was removed from the receiver. 0.2 mole of sebacic acid was added to the reaction mixture and stirred in. The pressure in the system was slowly reduced so that in twenty minutes a pressure of 120 millimeters of mercury pressure was established. The mixture was heated at this pressure at 245° C. for one hour. During this time, water, and some tetrahydrofuran distilled. The pressure in the polymerization reactor was reduced over a period of ten minutes to below one millimeter of mercury pressure and the temperature was raised to 265° C. Under these conditions the polycondensation was continued for 2.5 hours and the polyester attained an intrinsic viscosity of about 0.75. At atmospheric pressure and under nitrogen atmosphere 1.0 weight percent of 4 hydroxy 3,5 di tertiary butyl benzyl dimethyl phosphite stabilizer, based on weight of polymer, was added to the molten polymer. Polymerization was then continued by heating at 265° C. at about 1.0 millimeter of mercury pressure for an additional twenty minutes. The resulting stabilized polymer had an intrinsic viscosity of 0.751. A portion of the polymer was ground to pass a 20-mesh screen. It was vacuum dried at 135° C. for 16 hours. A sample of the ground polymer was aged in an open Petri dish in an electric heated oven at 150° C. in the presence of air. The intrinsic viscosity drop measured as percent broken bonds was 0.03 after three days aging at 150° C. as compared to 0.80% broken bonds for an unstabilized control polymer made and treated in same way.

A length of copper wire was coated with a vinyl resin insulating coat and then again coated by melt extrusion with a thin coating of an unstabilized polyester resin made according to the procedure of Example 2 without stabilizer being added to the resin. The coated wire was aged for seven days at 150° C. in an electric oven in the presence of air. The coating developed numerous cracks. The intrinsic viscosity of the polyester resin in the coating had dropped below 0.40. The acidity of the polyester resin increased considerably over what it was originally. The coated wire of this example was not acceptable for many applications in which such a wire is exposed to relatively high temperatures, especially those in which the wire is placed under stress.

Another length of copper wire was coated with a vinyl resin insulating coat and then again coated by melt extrusion with a thin coating of stabilized polyester resin prepared as in Example 2. The coated wire was aged for seven days at 150° C. in an electric oven in the presence of air. At the end of this period there were no visible cracks in the coating. The aged wire could be bent around itself without cracking the coating. Wire coated with this coating is suitable for use in applications where the wire will be exposed to somewhat elevated temperatures.

*Example 3*

A 5-pound quantity of a polymeric tetramethylene terephthalate/isophthalate/sebacate copolyester having an acid unit ratio of 70/10/20 respectively in the composition was prepared in a stainless steel reactor according to the process described in Example 2. This polyester composition was stabilized by adding 0.054 part per hundred of triphenyl phosphite and then 1.0 part per hundred of 4 hydroxy-3,5 di t-butyl benzyl dimethyl phosphite to the polymer in molten state and stirring to thoroughly mix it into the polymer.

The resulting stabilized polyester was dried and subjected to 150° C. oven aging tests as described in Example 2. The drop in intrinsic viscosity expressed in percent broken bonds was 0.02 for one day aging as compared with 0.81 for an unstabilized control polymer. The drop in intrinsic viscosity for three days aging was 0.04 as compared with 0.80 for an unstabilzed control polymer.

The hindered phenolic compounds containing phosphorous also stabilize the polyester resin against color degradation. The maximum benefit in regards to color stabilization is obtained when the hindered phenolic compound containing phosphorous is added after the completion of the ester interchange reaction or early in the polymerization process. The stabilizers have a hindering effect on the polymerization reaction when added early in the polymerization process, so it is generally preferred to add the stabilizer late in the polymerization process, or to the resin after polymerization is complete.

The examples illustrate the stabilization of polyethylene terephthalate resin and copolyester resin by adding the stabilizing agent to molten high molecular weight polymer. The stabilizing agents of the invention can also be incorporated in the resin by adding them to low molecular weight polyester having an intrinsic viscosity of 0.1 to 0.2 as measured in a 60/40 phenol-tetrachloroethane mixed solvent at 30.0° C. and condensing the low molecular weight polymer to form high molecular weight polymer or by adding them to the polyester-forming reactants such as the lower alkyl esters of the acids and the glycol and preparing the high molecular weight polymer from the reactants. Thus the stabilizing agents can be added to their original reactants, to the finished polyester resin or to the reactants at some intermediate stage in the preparation of the resins. It is preferred to add the stabilizing agents to the resin before polymerization is completed. Where exceptionally low color is desired the stabilizers may be added earlier in the polymerization process.

The invention has been illustrated particularly with respect to stabilizing polyethylene terephthalate and the 70/10/20 poly(tetramethylene terephthalate/isophthalate/sebacate) copolyester resins. The stabilizers are also effective in stabilizing other condensation resins. Representative examples of such condensation polyester resins are resins derived from dicarboxylic acids or ester-forming derivatives thereof and glycols, for example, polyethylene terephthalate, polypropylene terephthalate, polytetramethylene terephthalate, poly 2,2-dimethyl-1,3-propylene terephthalate, polycyclohexylene dimethylene terephthalate, polyethylene bibenzoate and copolyesters of terephthalic acid with an aromatic dicarboxylic acid such as ethylene terephthalate-ethylene isophthalate copolyesters containing various ratios of terephthalate to isophthalate, tetramethylene terephthalate-tetramethylene isophthalate copolyesters containing various ratios of terephthalate to isophthalate and copolyesters of an aromatic dicarboxylic acid such as terephthalic acid with one or more adiphatic dicarboxylic acids and copolyesters of one or more aromatic dicarboxylic acids with one or more aliphatic dicarboxylic acids, particularly copolyesters such as tetramethylene terephthalate-isophthalate-sebacate copolyesters in which the acid units are present in various ratios including the 70/10/20 copolyesters illustrated as well as the 75/5/20, 75/10/15, 60/20/20, 60/15/25 and other ratios. Dicarboxylic acids from which the resins can be derived are aliphatic dicarboxylic acids such as adipic acid, sebacic acid, dimer acid, and azelaic acid; aromatic dicarboxylic acids such as orthophthalic acid, isophthalic acid, terephthalic acid, 2,5-dichloroterephthalic acid, dibenzoic acid and the naphthalic acids. The resins can be made from various glycols including glycols such as the propylene glycols, the butylene glycols, pentamethylene glycol, hexamethylene glycol, decamethylene glycol, diethylene glycol, 1,4-cylclohexane dimethanol, and 2,2-bis-[4(beta hydroxyethoxy)phenyl] propane. Ethylene glycol is a preferred glycol because of its low cost and ready availability. Mixtures of glycols or mixtures of diacids may also be used. In addition to polyesters of the type disclosed above, block copolyesters and melt blends of polyester polymers or copolymers are also effectively stabilized by the hindered phenolic compounds of this invention.

In the preparation of the polyester resins various catalysts can be used. Suitable catalysts for the ester interchange reaction used to prepare the polyester resins are zinc acetate, manganese acetate, litharge, calcium acetate and the alkali metal alcoholates. Catalysts suitable for the condensation reactions by which the high molecular weight polymers are prepared are soluble antimony compounds such as antimony trioxide, lead compounds such as lead acetate and litharge and titanium compounds such as titanium alcoholates and polymeric ethylene glycol titanate.

The amount of the stabilizer used can be varied over a wide range of concentrations. Generally the amount used will be from about 0.01 to 2.0 percent by weight of the polyester resin used. The preferred amounts usable will be in the range of from about 0.05 to 1.0 percent by weight of the polyester resin to obtain optimum stability in the resin. While the stabilizer of the invention will usually be used as the sole stabilizing agent in the polyester resin, it can be used in conjunction with other stabilizing agents, such as triphenyl phosphite, if desired. If desired, pigments such as titanium dioxide, silicas, calcium carbonate and carbon may also be incorporated into the polyester being stabilized.

The reactions by which resins are prepared are in general carried out in accordance with the usual known techniques. Thus the resins are prepared from dicarboxylic acids and glycols or ester-forming derivatives thereof, generally by the ester interchange reaction of a lower alkyl ester of the acid with a glycol to form the glycol esters which are polymerized by condensation, with elimination of glycol to form high molecular weight resin. Direct esterification of the acids followed by polycondensation may also be used. The reactions are preferably carried out in the absence of oxygen, generally in an atmosphere of inert gas such as nitrogen or the like, in order to lessen darkening and to make it possible to prepare a high molecular weight lightly colored or colorless product. The condensation reaction is carried out under reduced pressure, generally below 10 millimeters of mercury pressure, and usually at or below one millimeter of mercury pressure at a temperature in the range of from about 260 to 290° C. to form high molecular weight polyester having an intrinsic viscosity of at least 0.3 and generally at least 0.4 measured in a 60/40 phenol-tetrachloroethane mixed solvent at 30.0° C.

Flexible copolyesters, based on mixtures of aromatic dicarboxylic acids and an aliphatic dicarboxylic acid and a glycol such as the polytetramethylene terephthalate/isophthalate/sebacate copolyester stabilized with hindered phenolic-phosphite antioxidant compounds are of particular interest for filament, film and coating applications where the materials will be subjected to high temperatures in the presence of air.

While certain representative embodiments and details have been shown for the purpose of illustrating the invention it will be apparent to those skilled in this art that various changes and modifications may be made therein without departing from the spirit or scope of the invention.

What is claimed is:

1. A process for improving the stability of a highly polymeric condensation polyester which comprises incorporating in the polyester resin a stabilizing amount of a phosphorus compound of the formula

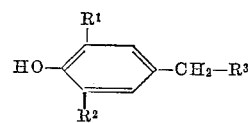

in which $R^1$ and $R^2$ are selected from the same and different radicals selected from the group consisting of tertiary alkyl radicals containing from 4 to 10 carbon atoms, aralkyl radicals containing from 6 to 10 carbon atoms and $R^3$ is a phosphorus containing radical selected from the group consisting of (A)

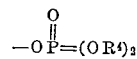

and (B) —O—P=(OR⁴)₂ in which the $R^4$ radicals in (A) and (B) are radicals selected from the group consisting of hydrogen, alkyl, aryl, alkaryl and aralkyl radicals.

2. A process for preparing polymeric condensation polyesters of improved stability which comprises mixing with the reactants used to prepare the polyester from 0.01 to 2.0 percent by weight based on the condensation polyester being prepared of a phosphorus compound of the formula

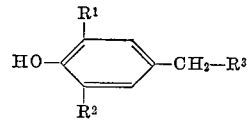

in which $R^1$ and $R^2$ are selected from the same and different radicals selected from the group consisting of tertiary alkyl radicals containing from 4 to 10 carbon atoms and aralkyl radicals and $R^3$ is a phosphorus containing radical selected from the group consisting of (A)

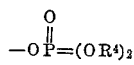

and (B) —O—P=(OR$^4$)$_2$ in which the R$^4$ radicals in (A) and (B) are radicals selected from the group consisting of hydrogen, alkyl, aryl, alkaryl and aralkyl radicals.

3. A process for preparing condensation polyesters of improved stability which comprises mixing with low molecular weight polyester from 0.01 to 2.0 percent by weight based on the condensation polyester of a phosphorus compound of the formula as set forth in claim 1 and polymerizing the polyester to form a high molecular weight polyester.

4. A process according to claim 1 in which the stabilizer is used in conjunction with another stabilizer.

5. The polyester composition comprising a linear condensation polyester resin containing a stabilizing amount of a hindered phenolic phosphorus compound of the formula as set forth in claim 1.

6. A stabilized polyester composition comprising a fused blend of polyester resins and a stabilizing amount of a hindered phosphorus compound of the formula set forth in claim 1.

7. A composition according to claim 5 in which the polyester resin is poly(tetramethylene terephthalate/isophthalate).

8. A composition according to claim 5 in which the polyester resin is poly(tetramethylene terephthalate/isophthalate/sebacate).

9. A composition according to claim 5 in which the polyester resin is polyethylene terephthalate.

10. A composition according to claim 5 in which the polyester resin is prepared from a mixture of glycols with at least one aromatic dicarboxylic acid.

11. A composition according to claim 5 in which the polyester resin is prepared from an aliphatic glycol and a mixture of aromatic dicarboxylic acids with at least one aliphatic dicarboxylic acid.

12. A composition according to claim 5 in which the polyester resin is derived from an aliphatic glycol and a mixture of an aromatic and an aliphatic dicarboxylic acid.

13. A composition according to claim 5 in which the hindered phenolic phosphite compound is

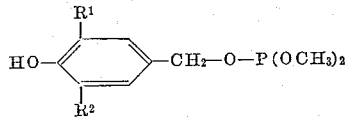

where R$^1$ and R$^2$ are tertiary butyl radicals.

14. A polyester composition stabilized with a hindered phenolic-phosphite and another stabilizer.

15. Polymeric ethylene terephthalate containing from 0.01 to 2.0 percent by weight of the formula

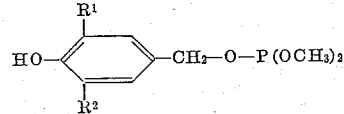

where R$^1$ and R$^2$ are tertiary butyl radicals.

16. A stabilized polyester composition according to claim 5 in which the polyester resin is a "block" type copolyester.

17. A stabilized polyester composition prepared according to claim 1 in which the polyester resin contains a pigment.

References Cited

UNITED STATES PATENTS

| | | | |
|---|---|---|---|
| 2,437,232 | 3/1948 | Rothrock et al. | 260—45.7 |
| 2,676,945 | 4/1954 | Higgins | 260—45.7 |
| 3,006,945 | 10/1961 | Goddard et al. | 260—45.95 |
| 3,145,177 | 8/1964 | Orloff et al. | 260—45.95 |
| 3,208,968 | 9/1965 | Cyba et al. | 260—45.7 |
| 3,224,973 | 12/1965 | Knapp | 260—45.95 |
| 3,243,413 | 3/1966 | Bell et al. | 260—45.95 |
| 3,039,993 | 3/1962 | Friedman | 260—45.95 |

MURRAY TILLMAN, *Primary Examiner.*

J. GOOLKASIAN, *Assistant Examiner.*